United States Patent [19]

Hinsperger

[11] Patent Number: 5,605,007

[45] Date of Patent: Feb. 25, 1997

[54] FABRIC-VENTED GREENHOUSE

[76] Inventor: Peter Hinsperger, 3262 Shelburne Place, Oakville, Ontario, Canada, L6L 5V9

[21] Appl. No.: 421,770

[22] Filed: Apr. 14, 1995

[30] Foreign Application Priority Data

Apr. 26, 1994 [CA] Canada .................................. 2122188

[51] Int. Cl.$^6$ .................................................. A01G 9/00
[52] U.S. Cl. .................................................. 47/17; 47/28.1
[58] Field of Search ....................... 47/17 MD, DIG. 14, 47/28.1 C, 28.1 F, 28.1 R, 17 FM

[56] References Cited

U.S. PATENT DOCUMENTS

| | | |
|---|---|---|
| 2,889,664 | 6/1959 | Olshansky . |
| 3,616,130 | 10/1971 | Rogosch et al. . |
| 3,627,620 | 12/1971 | Gasaway . |
| 3,857,934 | 12/1974 | Bernstein et al. . |
| 4,020,591 | 5/1977 | Seffinga et al. ...................... 47/28.1 |
| 4,304,068 | 12/1981 | Beder ........................................ 47/28.1 |
| 4,518,643 | 5/1985 | Francis . |
| 4,798,023 | 1/1989 | Morssinkhof et al. . |
| 5,070,643 | 12/1991 | Hinsperger . |
| 5,179,798 | 1/1993 | Sonagere . |
| 5,398,443 | 3/1995 | Johnston et al. ...................... 47/28.1 |

FOREIGN PATENT DOCUMENTS

| | | | |
|---|---|---|---|
| 0159165 | 10/1985 | European Pat. Off. . | |
| 2345220 | 3/1974 | Germany ...................... | 47/17 MD |
| 2639835 | 5/1977 | Germany . | |
| 3035232 | 4/1982 | Germany ...................... | 47/17 FM |
| 220490A1 | 12/1983 | Germany . | |
| 3917508 | 3/1990 | Germany ...................... | 47/17 MD |
| 8100442 | 8/1982 | Netherlands ................. | 47/17 FM |
| 0604538 | 4/1978 | U.S.S.R. ........................ | 47/28.1 C |
| 2251777 | 7/1992 | United Kingdom .......... | 47/28.1 R |

*Primary Examiner*—Terry Lee Melius
*Assistant Examiner*—Joanne C. Downs
*Attorney, Agent, or Firm*—McFadden, Fincham

[57] ABSTRACT

A greenhouse is disclosed having a raised central section of transparent or translucent flexible light-stabilized plastic material, and peripheral or vent sections substantially of open-weave scrim material formed from loosely woven thin and narrow strips of transparent or translucent light-stabilized plastic material having a lace-like reinforcement of light-stabilized plastic; with greater than 50% of the surface area of the scrim being deformable to a more open condition thereby permitting increased passage of air and moisture. Preferably, at least the central section is retractable.

17 Claims, 2 Drawing Sheets

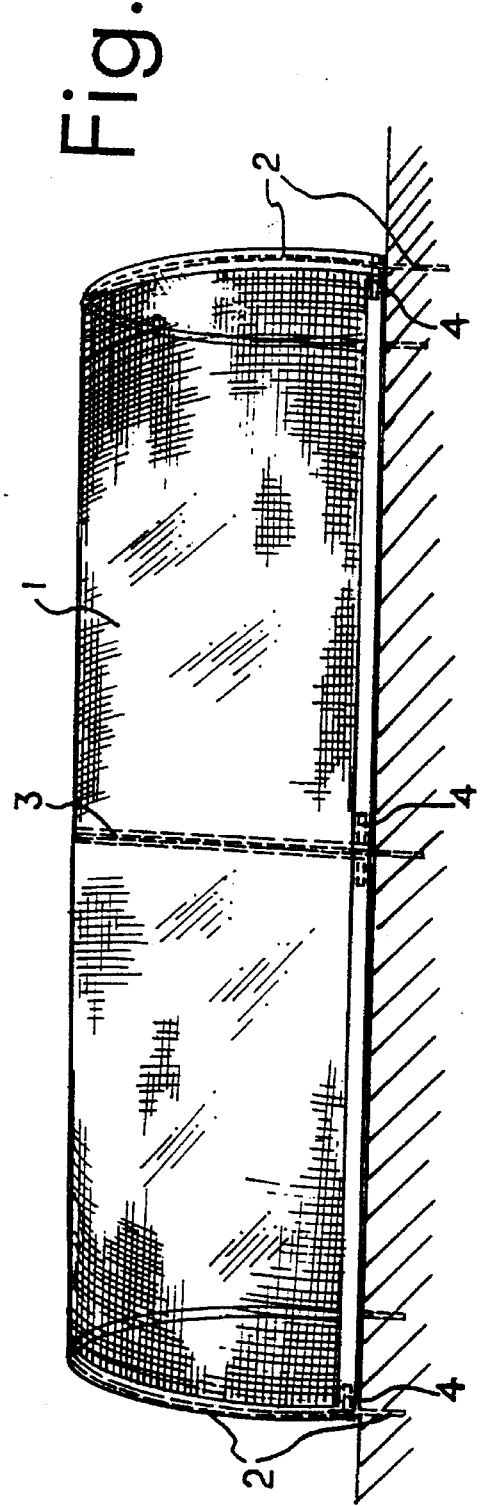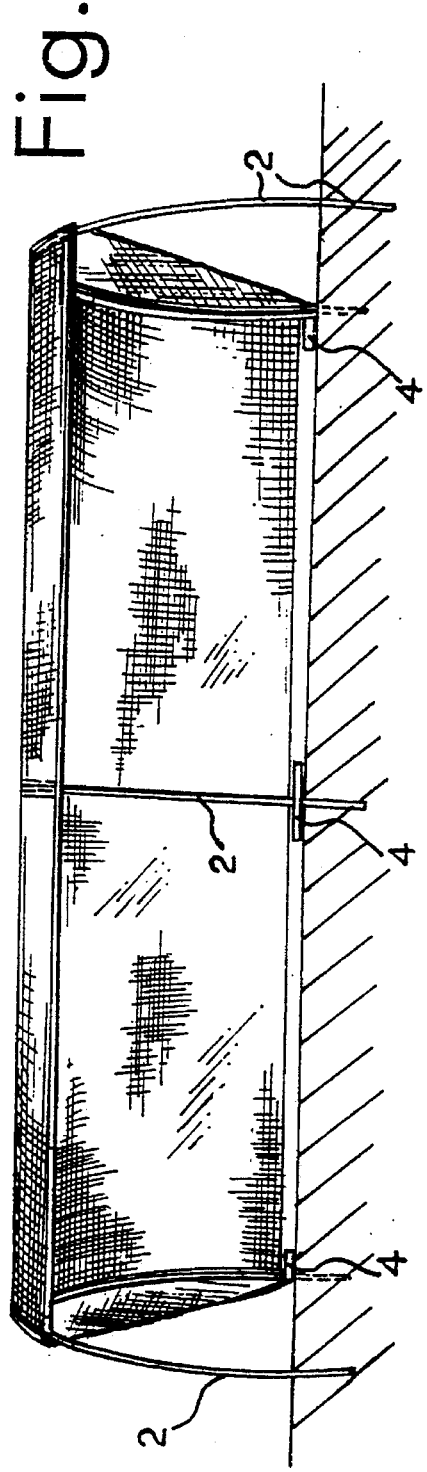

FABRIC-VENTED GREENHOUSE

This invention is directed to a greenhouse formed of transparent or translucent material in which vents are provided by use of an open-weave scrim material comprised of loosely woven ribbons of plastic material with a major portion of the scrim surface being deformable to increase passage of air and moisture.

BACKGROUND AND PRIOR ART

Since the advent of transparent plastic film, such plastic has been used as protection or covers for delicate seedlings or plants particularly in cold climates. Various supports, particularly metal or wood frames, have been used with such plastic to form rudimentary greenhouse-type structures. A typical structure is shown in U.S. Pat. No. 2,889,664 issued Jun. 9, 1959. More recently a portable greenhouse having a specific frame arrangement has been described in U.S. Pat. No. 5,179,798 issued Jan. 19, 1993.

Specific plastic sheet materials have been designed for plant protection e.g. a stable woven fabric made from polyolefin flat fibers used to cover seedlings (German (East) Patent No. DD 220490 A1 issued Dec. 23, 1983). Plant protective sheets having fixed protruding microperforations are described in U.S. Pat. No. 4,798,023 issued Jan. 17, 1989. A greenhouse structure can be formed using an expandable laminated sheet or fabric; it is understood that the sheet or fabric material has some capacity to expand or shrink in response to humidity and temperature changes (see Japanese Patent No. J 61 216 622 A issued Mar. 20, 1985). In U.S. Pat. No. 5,070,643 issued Dec. 10, 1991, C. Hinsperger has described a method of improving soil conditions or grass by covering the soil or grass directly with an open-weave scrim material formed from loosely woven strips of clear plastic, the open weave permitting passage of air and moisture.

It would be desirable to provide a vented greenhouse structure wherein the effective open area of the vent varies according to temperature and air pressure inside the greenhouse.

According to this invention, it has been found possible to use a specific type of open-weave material at vent locations in a greenhouse, such that the effective open area or porosity of the material self-adjusts (increases) in response to solar thermal build-up in the greenhouse.

SUMMARY OF THE INVENTION

This invention provides a fabric-vented greenhouse comprising:

(a) a central section cover of transparent or translucent flexible light-stabilized plastic material;

(b) at least one peripheral or vent section of substantially open-weave scrim material formed from loosely woven thin and narrow strips of transparent or translucent light-stabilized plastic material having a superimposed lace-like reinforcing ribbing of light-stabilized plastic, with greater than 50% of the surface area of the scrim being non-reinforced and deformable to a more open condition thereby to permit increased passage of air and moisture; and (c) support means for forming a raised central section from (a) and attached peripheral or vent section(s) from (b).

Preferably the ratio of the area of the central section material to the area of the total peripheral or vent section material is from about 2/1 to about 8/1 and selected to give the desired level of ventilation.

Most suitably the non-reinforced surface area within the scrim material able to deform to a more open condition, is from about 60% to about 80% of the scrim.

The invention includes, a method of ventilating a greenhouse structure having a central raised section, a peripheral or vent section, and support means;

comprising forming at least a vent portion of the peripheral or vent section from an open-weave scrim material formed from loosely woven thin and narrow strips of transparent or translucent light-stabilized plastic material having a superimposed lace-like reinforcing ribbing of light-stabilized plastic, the scrim being selected to have greater than 50% of the surface area of the scrim non-reinforced and deformable to a more open condition thereby to permit increased passage of air and moisture.

Desirably the open weave ribbon structure of the scrim is selected to be highly self-adjusting to increase effective porosity when subjected to excessive solar heating.

Preferably at least one of: the fabric vent surface area used in the greenhouse; and the initial or lay-flat porosity and latent or deformation porosity of the fabric vent; is selected to give the desired venting performance.

The invention includes the collapsed structure comprising (a), (b) and (c) in a conveniently transportable form.

BRIEF DESCRIPTION OF THE DRAWINGS

FIG. 1 is a side view of a portable version of a greenhouse according to the invention;

FIG. 2 is similar to FIG. 1 except showing in outline a partially retracted greenhouse with central and end sections retracted;

DETAILED DESCRIPTION OF THE PREFERRED EMBODIMENTS

Figure 3:
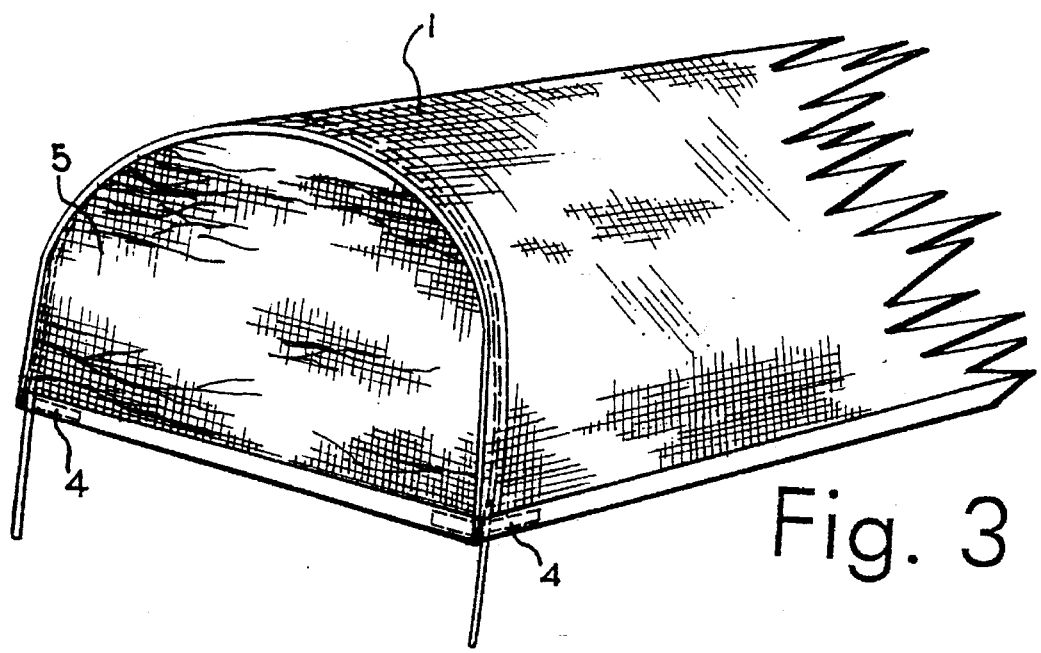
FIG. 3 is a perspective view of one end of the greenhouse of FIG. 1 showing the open-weave scrim in the end section.

The greenhouse can be of any convenient shape or size. One particularly convenient shape is a semi-cylinder as in FIG. 1, in which each peripheral or vent section is semi-circular. Other useful cross-sections can be square or rectangular, and triangular as long as the frame is able to minimize puddle formation on exposure to rain. Semi-polygonal or geodesic type structures also are operative.

The support means or frame, most suitably, is formed of rod or tube stock bent in the desired greenhouse cross-section shape, with the ends able to be anchored in the soil or turf. While plastic or wood frames are accepted, bendable metal rod or tube stock is preferred. Various hoop configurations have been found very suitable.

The central section cover (a) may be formed of woven or non-woven sheeting and may be fastened to the support or frame by any suitable means preferably releasable fasteners. One preferred fastening arrangement is fabric loops attached to the central section plastic cover and slidable on the frame. Such loops can be attached to the plastic by adhesive or sewing, or can be fused to the plastic. Such loops also can be formed of a Velcro™ like material seating onto a similar material positioned on the plastic.

It has been found preferred to have the central section retractable on the support means e.g. by sliding thereover, as illustrated in FIG. 2. Retraction is useful for access for weeding, pruning, watering, extra sunlight, etc. The peripheral or vent section may be similarly retractable.

The bottom of the central and/or peripheral sections may be weighted to increase stability and adherence to the ground.

The plastic material for the strips or ribbons in the open-weave scrim most suitably is a thermoplastic polymer, particularly a polyolefin such as polyethylene, polypropylene or their copolymers, all stabilized against degradation due to light. Various commercially available thermoplastic materials may be used which are substantially transparent or translucent. Lightly coloured thermoplastics which are not opaque are operative.

In forming the scrim, a sheet of plastic can be slit into suitably sized strips and the strips interwoven to leave relatively narrow slits in the warp direction. Preferably the weft direction strips are relatively widely spaced. The widely spaced weft strips allow the warp strips to twist easily and slide or otherwise deform to increase the effective open area or porosity. A desirable range of weft spacing has been found to be from about ⅛ inch to about ⅜ inch (about 3 to about 10 mm).

It has been found preferable to have the warp direction ribbons or strips relatively narrow in width to increase the number and effective area of the slits. The weft direction ribbons or strips are wider and more widely spaced for most effective performance. Most suitably the warp direction strips are selected to have a width within the range of about 1/16 inch to about ⅛ inch (about 0.8 to about 3.5 mm); and the weft direction strips are selected to have a width within about ⅛ inch to about ¼ inch (about 3 to about 7 mm). Desirably the non-reinforced scrim surface area in lay-flat condition has a porosity of about 5% to about 20% of the non-reinforced area and is expandable and self-adjusting in use to a more open condition of about 20% to about 50% porosity.

The lace-like reinforcing material may be of any similar non-opaque plastic to the scrim.

Both scrim and reinforcing are formed of thermoplastic and are thermally fused together into an integral structure. The lace-like reinforcing can be applied to the scrim by extruding and depositing hot melted thermoplastic over the surface of the scrim in irregular streams which on cooling harden and bond to the strips of the scrim. Alternatively the reinforcing can be preformed by similar irregular melt extrusion onto a flat non-adhering surface and the cooled lace-like reinforcing fused to the scrim e.g. by passing the layers between heated surfaces, or exposure to microwave, or heated air flow. Usually, the lace-like reinforcing will be clear but may be lightly coloured if desired. The reinforcing ribbing will occupy less than 50% of the surface area of the scrim, preferably from about 20% to about 40%. The reinforcing ribbing may be applied to one or to both sides of the woven scrim and has been found necessary to stabilize the open weave scrim structure. Reinforcing both sides is ideal for added strength and UV protection.

Most preferably the interwoven scrim ribbons or strip material (both the warp and weft) has a higher thermal fusion temperature than the lace-like reinforcing material so that on thermal fusion the reinforcing will fuse to the ribbons without the warp and weft ribbons fusing to each other. It has been found that when the warp and weft ribbons or strips are not fused to each other, the scrim has greater deformability and latent vent capacity.

In constructing the greenhouse, the open weave scrim material may be fastened or seamed onto the central section plastic sheeting by any suitable means. In one aspect the ends of the plastic sheeting and scrim are overlapped and stitched or fused at vent locations, most preferably using a fabric seam cover e.g. as in FIG. 4. A fabric seam cover desirably is used at the lower edges of the central section plastic as well. In another aspect, releasable fasteners can be used to attach the scrim material and the fabric vent made completely retractable. Suitable fasteners include Velcro™ type and zipper type.

Referring to the drawings, which serve as an example, FIG. 1 illustrates one type of portable greenhouse, having central section 1 and three hoop supports 2. The central section optionally is seamed at 3, and has a total of six releasable fasteners 4 to the hoop supports 2 at the bottom (three per side as shown). Supports 2 are shown as dotted where they are inserted into the soil or turf.

FIG. 2 shows the central Section 1 partially retracted over the hoop supports 2. The end (vent) sections can be partially retracted while fastened to the central section 1 or suitable fasteners (not shown) can be released to leave the end sections non-retracted. Other aspects are as in FIG. 1.

FIG. 3 is a perspective end view showing the end (vent) section 5 formed of reinforced scrim material. Releasable fasteners 4 are shown at the bottom corners and enclose the hoop support 2.

Figure 4:
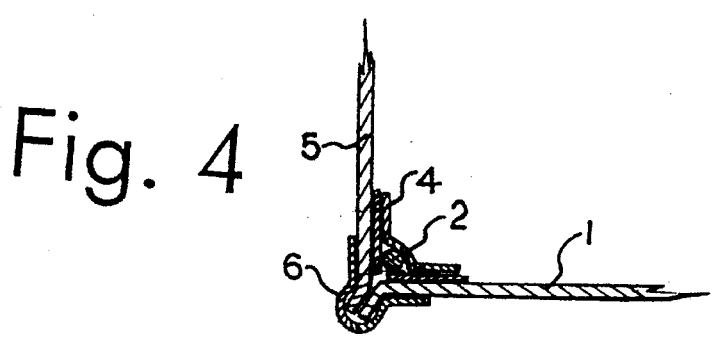
FIG. 4 is an enlarged cross-sectional view of one corner of the greenhouse of FIGS. 1, 2 and 3.

FIG. 4 is a horizontal cross-section of a corner of FIG. 3 showing a portion of central section 1 meeting end scrim material 5 in a stitched or fused seam (fabric-covered) at 6. Support 2 is fastened to the corner by releasable Velcro™-type strip 4.

Figure 5:
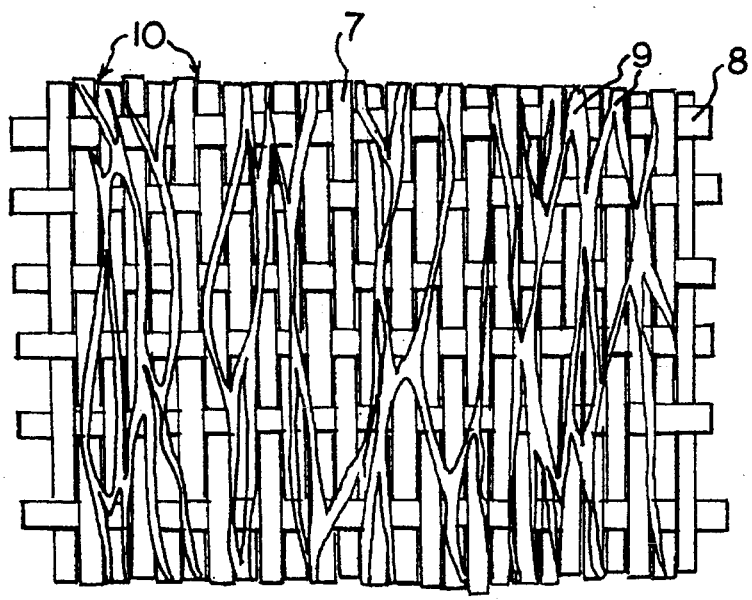
FIG. 5 is an enlarged view of a portion of the open-weave scrim in the end section as in FIG. 3.

FIG. 5 is a view of a portion of one typical reinforced scrim fabric vent (actual size) showing the warp direction strips 7, the weft direction strips 8, and the reinforcing ribbing 9. The slits between the warp direction strips 7 are shown at 10. These slits 10 can enlarge by twisting and sliding of strips 7 and by some accommodating movement of strips 8. The amount and positioning of the lace-like reinforcing ribbing 9 will have some effect on the extent of movement of strips 7 and 8 possible, and can be varied to alter venting performance. A more open lace-like reinforcing can be used when applied to both sides of the woven scrim and this constitutes a preferred embodiment.

The embodiments of the invention in which an exclusive property or privilege is claimed are defined as follows:

1. A fabric-vented greenhouse comprising:

(a) a central section of transparent or translucent flexible light-stabilized plastic material having a surface area;

(b) at least one peripheral or vent section of substantially open-weave scrim material having an initial open condition and formed from loosely woven thin and narrow strips of transparent or translucent light-stabilized plastic material having a superimposed lace form reinforcing ribbing of light-stabilized plastic, with greater than 50% of the surface area of the scrim material being non-reinforced and deformable from said initial open condition to a second open condition to permit increased passage of air and moisture;

(c) support means for forming a raised central section from (a) and an attached peripheral or vent section from (b), said central section having a bottom portion; and (d) fastener means for securing said central section and said peripheral or vent section about said support means and said bottom portion.

2. The greenhouse of claim 1, wherein the ratio of the area of the central section material of (a) to the area of the total peripheral or vent section material of (b) is from about 2/1 to about 8/1 and selected to give the desired level of ventilation.

3. The greenhouse of claim 1, wherein said open-weave scrim material is deformable from about 60% to about 80% relative to said initial open condition.

4. The greenhouse of claim 1, wherein the non-reinforced scrim surface area in initial open condition has a porosity of about 5% to about 20% of the non-reinforced area.

5. The greenhouse of claim 4, wherein the initial open condition porosity is expandable and self-adjusting in use to said second open condition of about 20% to about 50% porosity.

6. The greenhouse of claim 1, wherein the central section (a) is retractable.

7. The greenhouse of claim 6, wherein the central section is formed from woven polyethylene, polypropylene or ethylene-propylene copolymer.

8. The greenhouse of claim 1, wherein the scrim material in (b) is formed from polyolefin ribbon woven to leave a series of open slits.

9. The greenhouse of claim 8, wherein the woven ribbons in the scrim material are thermally fused to a lace-like reinforcement of polyolefin material.

10. The greenhouse of claim 9, wherein the woven ribbons in the scrim material have weft ribbons displaced from each other sufficiently to allow the intervening stretches of warp ribbon to twist and thereby enlarge the slit therebetween.

11. The greenhouse of claim 10, wherein the warp ribbons have a width of about 0.8 to about 3.5 mm; the weft ribbons have a width of about 3 to about 7 mm; and the spacing between the weft ribbons is about 3 to about 10 mm.

12. The greenhouse of claim 1, wherein the support means (c) includes arch members.

13. The greenhouse of claim 12, wherein the central section (a) is attached to support means (c) by releasable fasteners, to allow retraction.

14. The greenhouse of claim 13, wherein each vent section (b) is secured directly to an appropriate periphery of central section (a).

15. The greenhouse of claim 14, wherein each vent section (b) is releasable and retractable.

16. The greenhouse of claim 15, wherein each vent section (b) is vertically disposed.

17. The greenhouse of claim 1, adapted to be collapsible and portable.

* * * * *